US008979472B2

(12) United States Patent
Hayman et al.

(10) Patent No.: US 8,979,472 B2
(45) Date of Patent: Mar. 17, 2015

(54) DIRECTIONAL, SEALABLE WIND-POWERED TURBINE (76) Inventors: James Heathcote Hayman, New York, NY (US); Hugh Harold Nohrnberg Savoldelli, New York, NY (US); James Lamport Lucenti Savoldelli, New York, NY (US); Jeffrey Daniel Weiner, Tenafly, NJ (US)

( * ) Notice: Subject to any disclaimer, the term of this patent is extended or adjusted under 35 U.S.C. 154(b) by 602 days.

(21) Appl. No.: 13/366,924

(22) Filed: Feb. 6, 2012

(65) Prior Publication Data

US 2012/0134775 A1    May 31, 2012

(51) Int. Cl.
*F01D 1/04* (2006.01)
*F03D 9/00* (2006.01)
*F03D 1/02* (2006.01)
*F03D 1/04* (2006.01)

(52) U.S. Cl.
CPC .. *F01D 1/04* (2013.01); *F03D 9/00* (2013.01); *F03D 1/02* (2013.01); *F03D 1/04* (2013.01); *F05B 2240/14* (2013.01); *F05B 2260/24* (2013.01); *F05D 2260/24* (2013.01); *F05D 2240/14* (2013.01); *Y02E 10/465* (2013.01); *Y02E 10/72* (2013.01)
USPC .......................................................... 415/4.3

(58) Field of Classification Search
USPC ............. 415/4.1, 4.3, 4.5, 15, 13, 219.1, 909, 415/220, 47, 146, 147, 148, 151; 290/44, 290/55; 416/40, 41, 54, 55, 117
See application file for complete search history.

(56) References Cited

U.S. PATENT DOCUMENTS

| | | |
|---|---|---|
| 3,409,305 A | 11/1968 | Nieland |
| 4,238,687 A | 12/1980 | Martinez |
| 4,306,834 A | 12/1981 | Lee |
| 5,272,378 A | 12/1993 | Wither |
| 6,373,145 B1 | 4/2002 | Hamrick |
| 6,409,467 B1 | 6/2002 | Gutterman |
| 6,809,432 B1 | 10/2004 | Bilgen |
| 6,840,408 B1 | 1/2005 | Foster et al. |
| 7,098,553 B2 | 8/2006 | Wiegel et al. |
| 7,193,332 B2 | 3/2007 | Spinelli |

(Continued)

OTHER PUBLICATIONS

Darrel Dodge, An Illustrated History of Wind Power Development, Web page, url:http://www.telosnet.com/wind/, accessed: Oct. 3, 2011.
Ghetzer Aero-Power, Product Summary, Buffalo Grove, Illinois, Web page, url: http://www.ghetzleraeropower.com/products.htm, accessed: Oct. 3, 2011.

(Continued)

*Primary Examiner* — Dwayne J White
*Assistant Examiner* — Justin Seabe
(74) *Attorney, Agent, or Firm* — Michael J. Feigin, Esq.; Feigin & Associates, LLC (57) ABSTRACT A cylindrical wind-turbine has an intake opening set in a known direction of oncoming wind (such as towards the direction of an expected oncoming train). A central plunger acts as a valve to regulate airflow, and may seal the intake opening. Exit valves are situated near the rear of the device and/or at the rear in embodiments of the disclosed technology. The intake opening and exit valves may be opened or closed depending on readings from wind and water sensors. Generally speaking, when there is sufficient wind and low threat of water, the openings and valves are open, collecting wind energy. When there is a lack of wind or presence of water, the openings and valves are sealed to protect the interior components of the device from the elements and unnecessary wear and tear, prolonging the life of the device.

19 Claims, 9 Drawing Sheets

(56) References Cited

U.S. PATENT DOCUMENTS

| | | |
|---|---|---|
| 7,427,173 B2 | 9/2008 | Chen |
| 7,525,210 B2 | 4/2009 | Fein et al. |
| 7,547,984 B2 | 6/2009 | Fein et al. |
| 7,946,814 B2 * | 5/2011 | Honhoff .......................... 416/1 |
| 2002/0148418 A1 | 10/2002 | Hope |
| 2003/0133783 A1 * | 7/2003 | Brock et al. ................. 415/4.2 |
| 2006/0239832 A1 | 10/2006 | Uriel |
| 2009/0039650 A1 * | 2/2009 | Nies ............................... 290/44 |
| 2009/0060748 A1 * | 3/2009 | Landa et al. ............... 416/93 R |
| 2011/0017317 A1 | 1/2011 | Pritschet |
| 2011/0135471 A1 | 6/2011 | Wangford |
| 2011/0148112 A1 * | 6/2011 | Ormel et al. .................... 290/44 |

OTHER PUBLICATIONS

Carleton College, The History of Carleton's Wind Turbine, Web page, url: http://apps.carleton.edu/campus/facilities/sustainability/wind_turbine/, dated: Oct. 4, 2006.

Wapedia, Conventional and Unconventional Wind Turbines, Web page, url: http://wapedia.mobi/en/Unconventional_wind_turbines, dated: Aug. 31, 2011.

* cited by examiner

DIRECTIONAL, SEALABLE WIND-POWERED TURBINE

FIELD OF THE DISCLOSED TECHNOLOGY

The disclosed technology relates generally to wind turbines and, more particularly, towards a wind turbine designed for use in areas with a predictable single wind direction.

BACKGROUND OF THE DISCLOSED TECHNOLOGY

Wind power is one of the greenest renewable energy sources; however, its use across the United States suggests that it is not well suited to urban environments. Of the ten largest cities in the United States, only one, Chicago, falls within an area of even marginal and fair winds for use by a wind farm. The best winds are found in the Dakotas, the northernmost portion of Texas, and Kansas. These locations, however, are less populated, meaning that cost savings resulting from generation of power from wind are offset by the infrastructure needs to transport such electricity to cities where it is needed.

Still further, winds are stronger in the winter, but energy usage is highest in the summer. For example, average wind speed in the United States in March is about 11 miles/hour, but energy usage is about 800 kilowatt/hour. In July, average wind speed is about 8 miles/hour, but energy usage is at about 3000 kilowatt/hour, average in the United States! Even more so, winds are stronger at night, but energy usage is highest during the day.

What is needed is a way to harness wind energy in the area where it is required most, and at the time of greatest need. It is also desirable to have wind speeds at their maximum to best convert wind energy into electrical energy.

SUMMARY OF THE DISCLOSED TECHNOLOGY

An object of the disclosed technology is to harvest wind energy from moving railroad and subway cars.

A further object of the disclosed technology is to harvest wind energy in cities at times and places of maximal wind, these times further corresponding to maximal use of electric power.

Yet another object of the disclosed technology is to provide a wind turbine which can withstand changes in weather, including rain, snow, and ice.

In an embodiment of the disclosed technology, a wind turbine has an elongated outer housing with an intake portal at one end thereof, a plunger extending in a direction of said elongated outer side of the housing, movable in a lateral direction to seal the intake portal, and at least one sealable exit vent. A hollow space adapted for airflow is formed between the elongated outer housing and the plunger. The wind turbine may further have a water sensor wherein, upon detection of water above a pre-designated threshold (of nearness or volume), the plunger seals the intake portal and at least one sealable exit vent is sealed. The device may also have a wind sensor, and the intake portal and at least one sealable exit vent are opened upon detection by the wind sensor of wind above a pre-designated threshold.

The wind turbine may be fixed to a position underneath a train or subway track. The wind sensor may be electrically coupled to a second wind turbine, this second wind turbine receiving wind from a train traveling in a direction towards the first wind turbine. The intake portal and the at least one sealable exit vent of the wind turbine may be opened based on detection of wind at this second turbine, because this detection of wind is indicative of a train approaching the first wind turbine. The wind detector may also be in the form of a vibration detector, as an oncoming train may cause the ground or a track to which the turbine is affixed to vibrate.

In an embodiment of the disclosed technology, the exit vents are exit vents spaced around a periphery of the outer housing, all equidistant from either side of an elongated length of the elongated outer housing, and may further include an exit vent at an end of the elongated length of the housing (opposite the intake opening). A blade/rotary mechanism may be situated between the plunger and outer housing (in the path of the air between the intake opening and exit vent or vents).

A system of placing wind turbines in proximity to train or subway tracks in also claimed. In this system, a series of wind turbines (such as those described above), each with an intake opening facing towards an anticipated direction of an oncoming train, has an openable and sealable intake. At least one water sensor proximate to each wind turbine is present. Upon detection by a wind sensor of wind from a passing train above a pre-designated threshold (e.g., 8 kilomoters per hour), at least one wind turbine proximate to a location where the train is expected to pass opens its intake opening.

Wind turbines used in the above embodiment may further have at least one water sensor proximate to each wind turbine, wherein, upon detection of water by a water sensor, a wind turbine to which the water sensor is physically attached or proximate, closes the intake. Similarly, exit vents may also open/close upon such detections of wind/water. This may occur on a single wind turbine, or on all proximate wind turbines (proximate will be defined in the detailed description). The closing and opening of intake openings and exit vents allow for the sealing off of interior space of the wind turbine, in an embodiment of the disclosed technology.

The intake opening and the exit vents of a wind turbine of the series of wind turbines are closed, in an embodiment of the disclosed technology, unless all of the following criteria are met: a) at least one water sensor within a pre-determined distance from the wind turbine detects a lack of water, threatening the wind turbine (threatening will be defined in the detailed description, and includes water from below or rain from above); b) at least one wind sensor detects wind from a passing train, the train passing in a direction towards the intake opening of the wind turbine in question; and c) functions of the wind turbine are determined to be operational, such as through persistent providing of data, internal diagnostics running appropriately, the response to remote commands from a central control station, and so forth.

DETAILED DESCRIPTION OF EMBODIMENTS OF THE DISCLOSED TECHNOLOGY

In an embodiment of the disclosed technology, a cylindrical wind-turbine has an intake opening set in a known direction of oncoming wind (such as towards the direction in which trains pass). A central plunger acts as a valve to regulate airflow, and may seal the intake opening. Exit valves are situated near the rear of the device (away from the intake valves) and/or at the rear (on a side opposite the intake valve) in embodiments of the disclosed technology. The intake opening and exit valves may be opened or closed, depending on readings from wind and water sensors. Generally speaking, when there is sufficient wind and low threat of water, the openings and valves are open, collecting wind energy. When there is a lack of wind or a presence of water, the openings and valves are sealed to protect the interior components of the device from the elements and unnecessary wear and tear, prolonging the life of the device.

Embodiments of the disclosed technology will become clearer in view of the following description of the figures.

Figure 1:
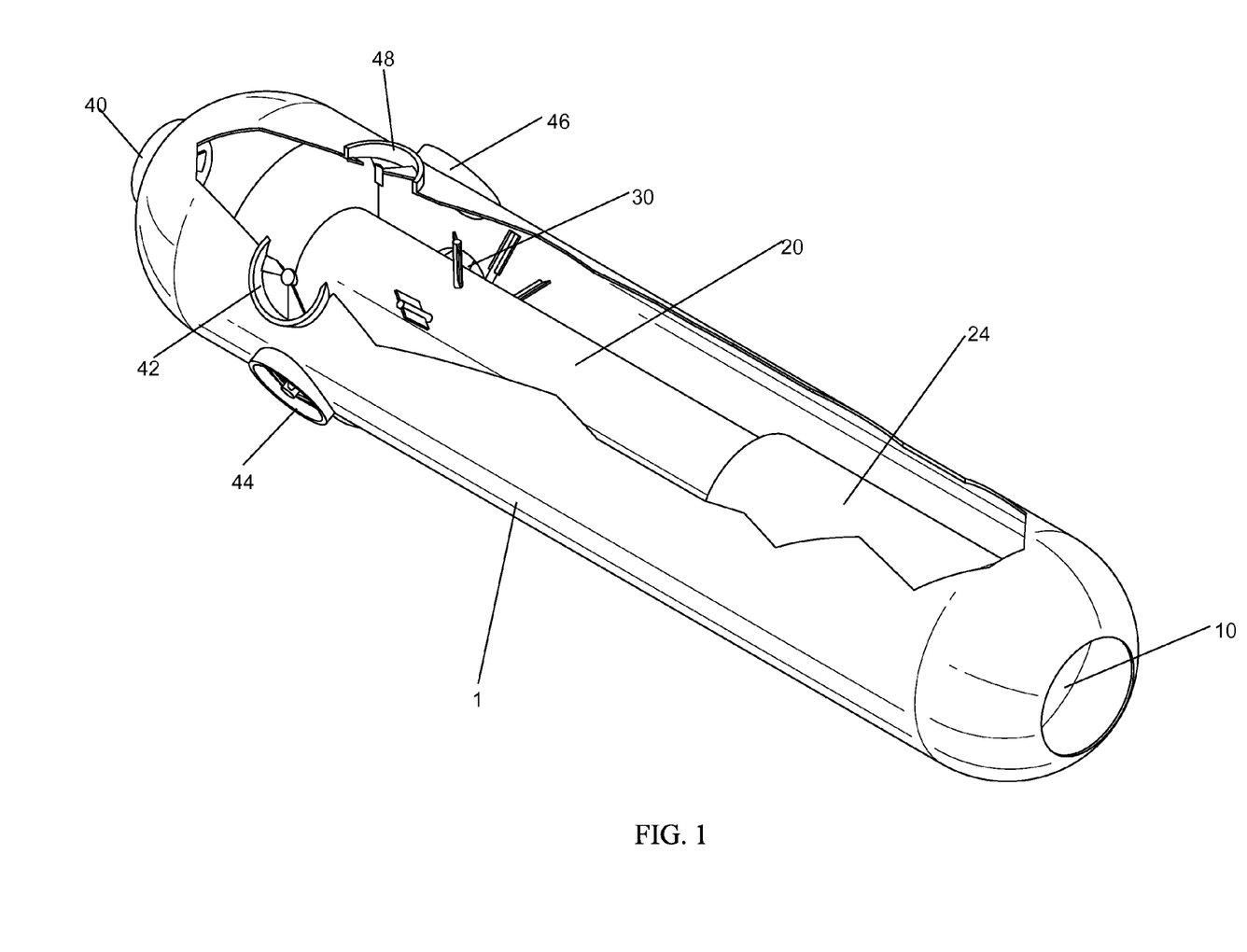
FIG. 1 shows a perspective view of a wind turbine of embodiments of the disclosed technology, with a portion of an exterior shell cutaway.

FIG. 1 shows a perspective view of a wind turbine of embodiments of the disclosed technology, with a portion of an exterior shell cutaway. The wind turbine, having an exterior shell 1, has an intake opening or portal 10 which is positioned in the direction of oncoming wind. A plunger 20 with head 24 is centrally located within a central region of the wind turbine, creating an air passageway through the intake 10 and around the plunger 20. As wind flows, it turns vanes 30 and/or vanes on peripheral outtake (exit) valves 42, 44, 46, 48 and rear outtake (exit) valve 40. In this manner, wind flow is captured through the device pointing towards oncoming wind, flows there-through, and is converted into rotary energy at the vanes, and is then transformed into electrical energy.

Figure 2:
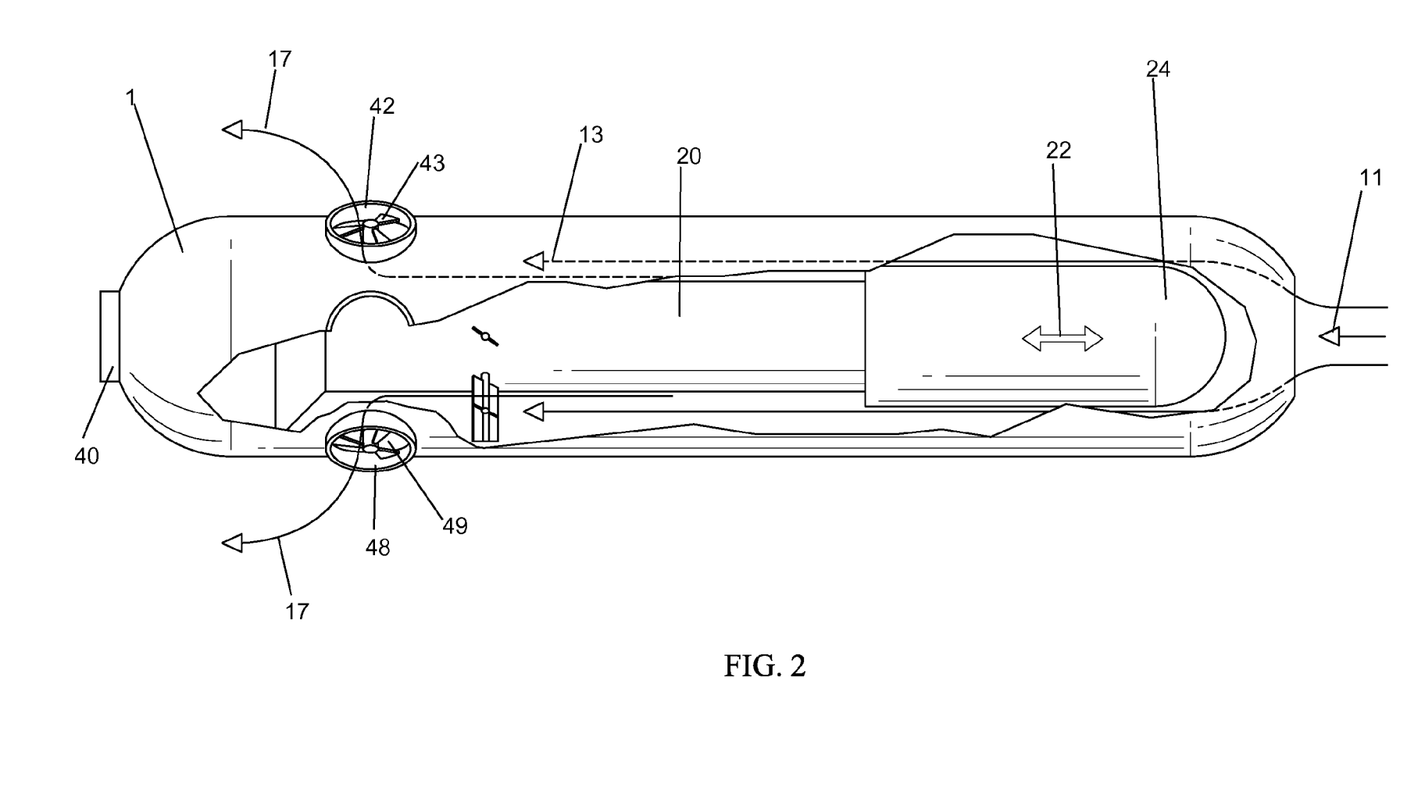
FIG. 2 shows a side, partial-cutaway view of a wind turbine of an embodiment of the disclosed technology.

FIG. 2 shows a side, partial-cutaway view of a wind turbine of an embodiment of the disclosed technology. In this figure, the direction of the wind is shown. Oncoming wind 11 passes into the intake 10 of the wind-turbine and then proceeds around the sides of the plunger 20 in direction 13, and ultimately, out of the outtake valves in direction 17. The head of the plunger 24 can be positioned closer or further away from the intake opening by moving it in the plus or minus direction, as indicated by the double arrow 22. The closer the plunger 24 is to the intake, the less volume of air can enter, but depending on wind speed, direction of the wind, and temperature, the distance form the opening is calibrated to ensure highest velocity and least turbulence for maximal energy harvesting. That is, when the wind speed is higher, the plunger 22 is typically placed closer to the intake opening 10 than when the wind speed is lower.

Still referring to FIG. 2, the outtake (exit) vents include any number of vents around the periphery of the device, extending through the outer shell 1. These vents include vanes which may be used for both generating electricity based on being rotated by passing wind, and/or sealing the device when necessary. In this view, the sides of two periphery outtake (exit) vents 42 and 48 are visible, having respective vanes 43 and 49. Another vent, also serving one or more of the purposes of the periphery vanes, is an outtake vent 40 at the far end of the device. Wind passing generally straight through the device (defined as from end to end) exits through the rear outtake vent 40 and continues in the path it was traveling before entering the device.

Figure 3:
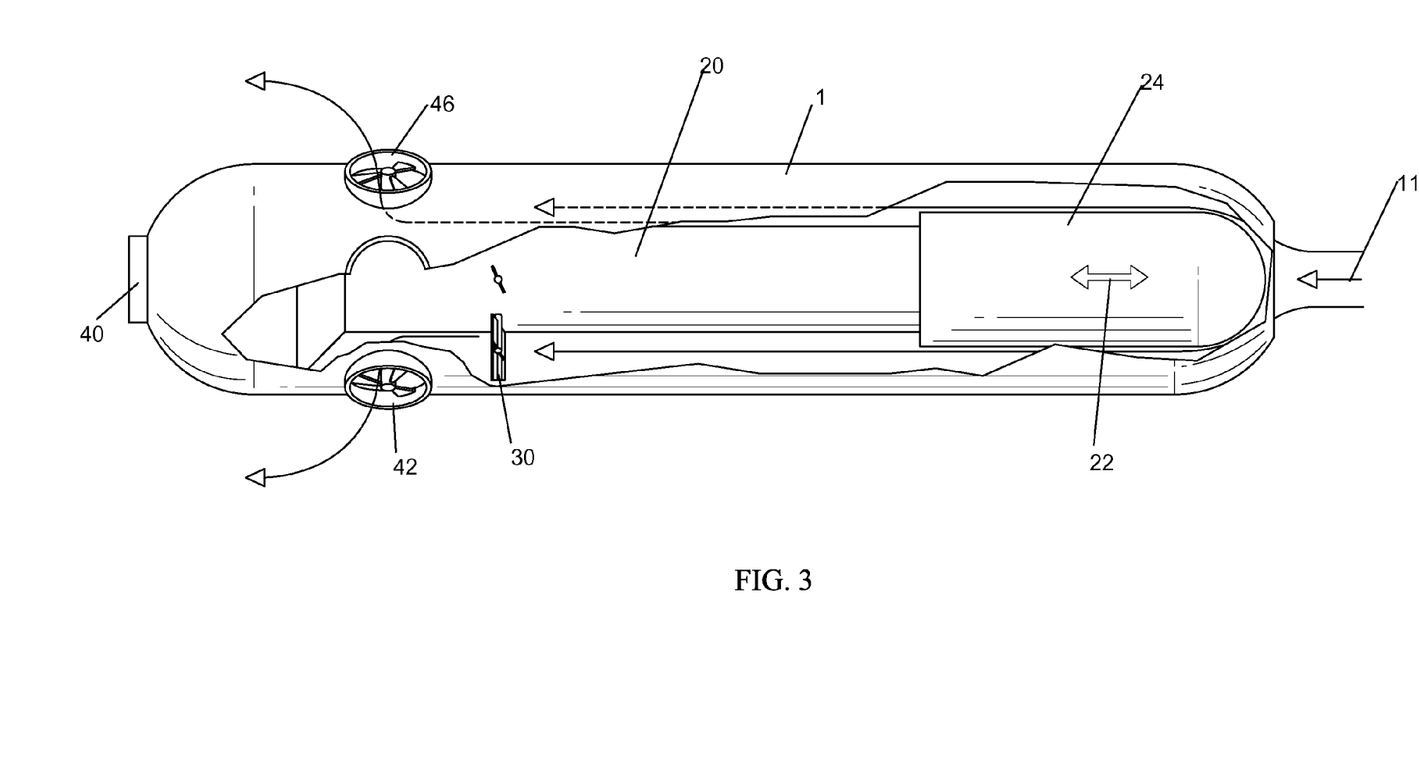
FIG. 3 shows the side, partial-cutaway view of the wind turbine of FIG. 2 with a sealed intake.

FIG. 3 shows the side, partial-cutaway view of the wind turbine of FIG. 2 with a sealed intake. This figure is an instantaneous snapshot as the intake 10 is sealed. The air flow 11, 13, and 17 (unnumbered in this figure) tapers off/stops. Simultaneously, or immediately thereafter, the plunger 24 moves in a positive direction 22 to close off the intake; the outtake vents 40, 42, and 46 are also sealed. This may occur for one of the following reasons: a) the wind has dropped below a pre-defined threshold, b) the presence of water has been detected, c) the interior components of the turbine within housing 1 are at risk of damage or malfunction. To make such determinations, sensors may be placed on the inside or outside of the device, such as on the surface of exterior shell 1, or connected via a probe. A probe, detecting threats of water to a wind turbine, may be beneath the altitude or position (such as buried in the ground) of the device to detect rising water levels, or above the device to detect rain. Still further, probes may be used to determine temperature and wind speed.

For example, when such a device is placed in-line with a subway track or underneath a railroad track, a probe or signal/notification may indicate to the device that a train is approaching and to open the intake and exit vents to capture the wind power. When the train passes, or the wind speed drops below a certain threshold, the device then seals automatically until the next signal is received indicating an approaching train. In this manner, the device stays closed except when wind is expected. Such a signal that a train is approaching might be ignored if water is already detected. In this manner, the turbine remains sealed when it is raining or flooded, to avoid damage or excess wear to the device. Each probe/sensor (water or wind) may be placed proximate to each wind turbine. "Proximate," for purposes of this disclosure, is defined as being physically attached to the wind turbine by way of a wire or casing of the sensor joined with the body of the wind turbine. "Proximate" is alternatively defined as within a designated area, such as within 1 km of a wind turbine for purposes of sealing turbines due to water, or all wind turbines which are located in an area affected by passing wind of a train between that of a reference wind turbine and the next train station, up to a maximum distance of 1, 3 or 5 km. In this manner, those wind turbines which are "down track" (located at a position expected to be affected by wind of a passing train, the wind heading towards the intake 10) are considered "proximate." Wind turbines at a location where a train passes before passing a reference wind turbine, heading towards an intake opening 10, are designated as "up track" for purposes of this disclosure.

Figure 4:
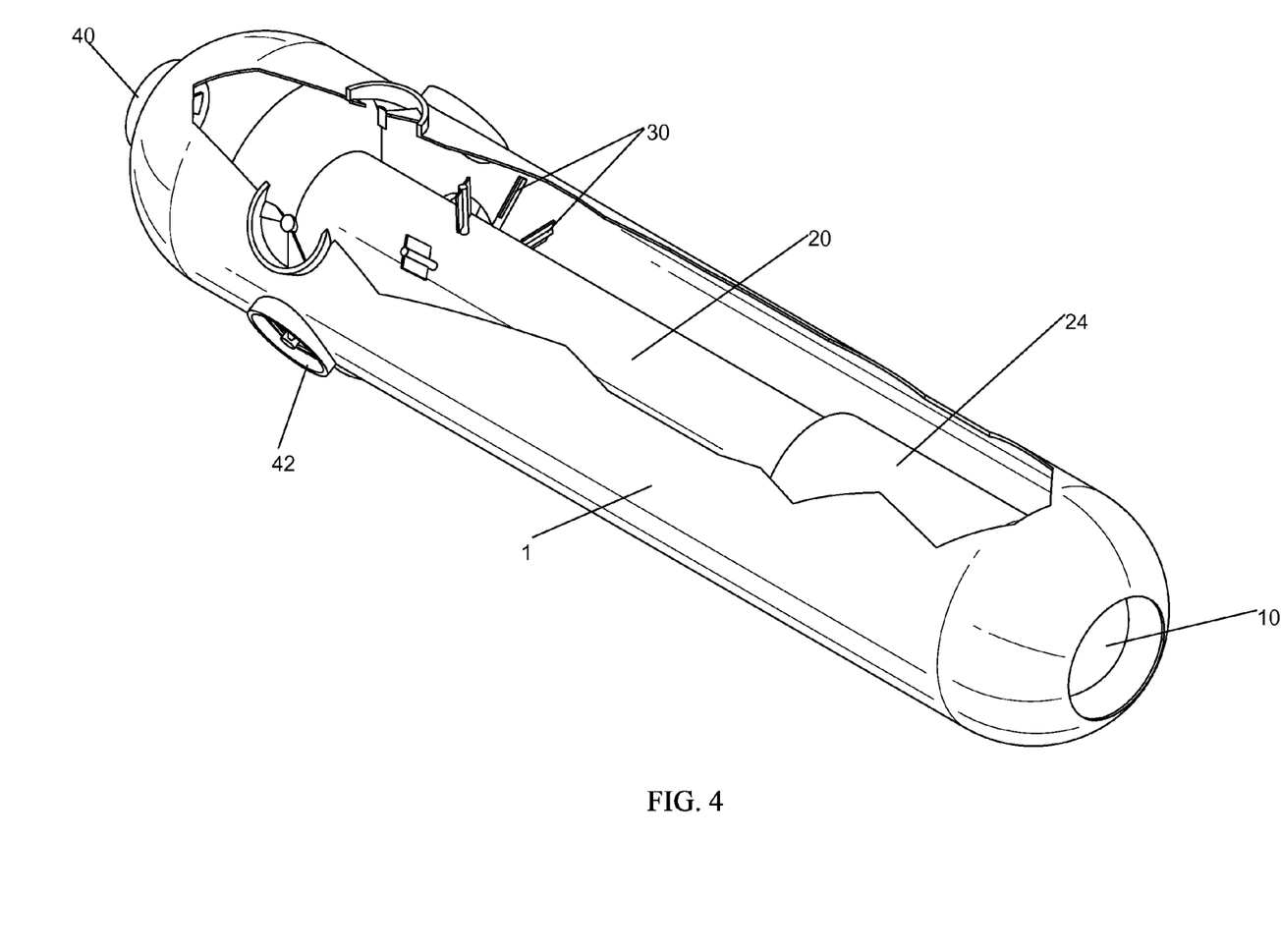
FIG. 4 shows a perspective view of the wind turbine of FIG. 3 with a sealed intake.
Figure 5:
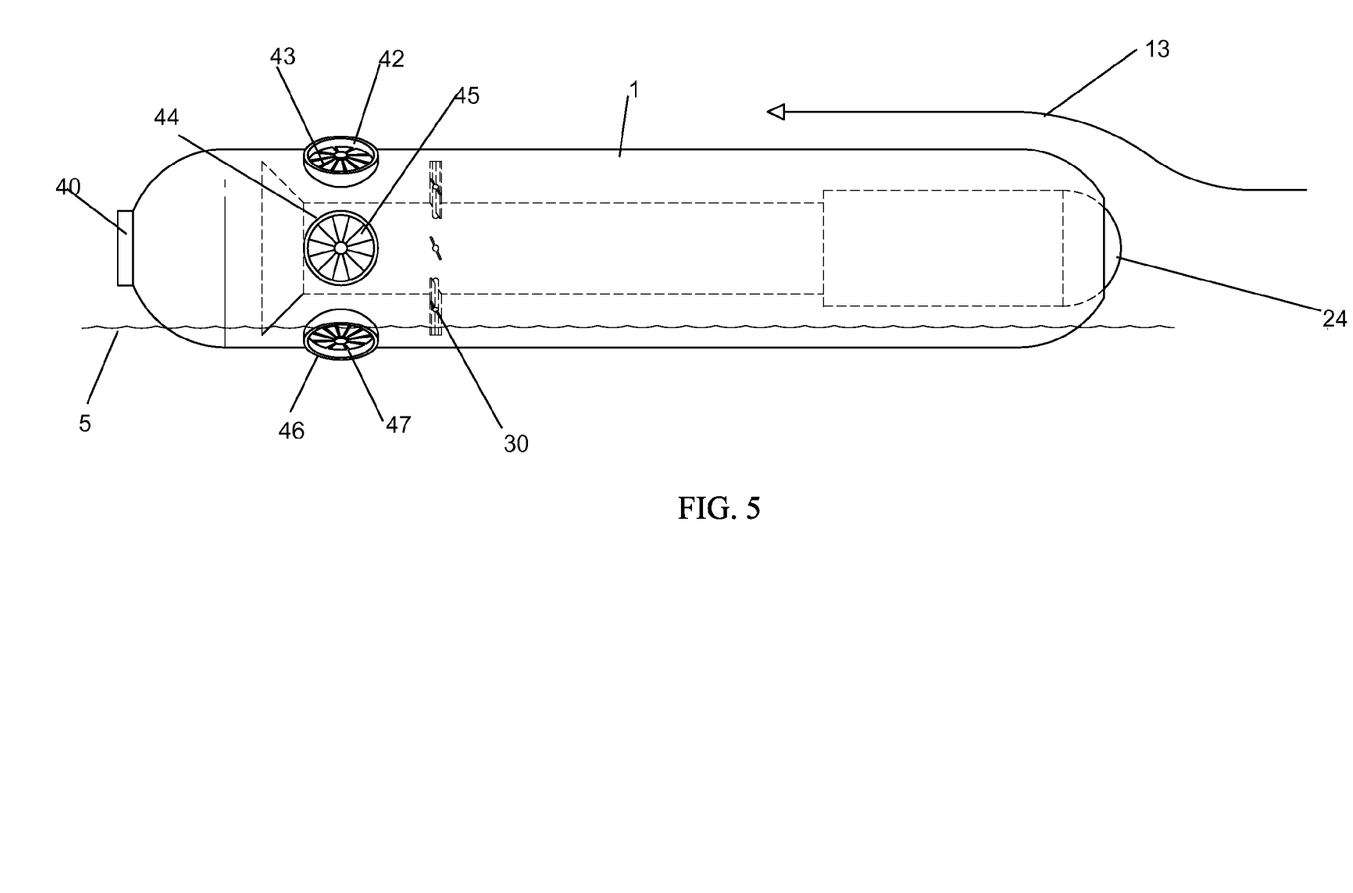
FIG. 5 shows a side elevation view of the wind turbine of FIGS. 3 and 4 with a sealed intake and sealed vents, partially submerged in liquid, in an embodiment of the disclosed technology.

FIG. 4 shows a perspective view of the wind turbine of FIG. 3 with a sealed intake. FIG. 5 shows a side elevation view of the wind turbine of FIGS. 3 and 4 with a sealed intake and sealed vents, partially submerged in liquid, in an embodiment of the disclosed technology. The plunger 24 extends into the cavity 10, blocking entry of air or water. The exit valves 40, 42, 44 and 46 are sealed by the vanes 41 (shown in other figures), 43, 45, and 47. In this manner, the vanes that spin may also double as seals by being reconfigured, such as by separating vanes from each other and locking them in place. Alternatively, label 45 may represent a disc which extends over the vanes inside valve 44, to cover and seal the valve. Note that, in FIG. 5, water 5 is shown and the turbine is partially submerged in water. As such, the turbine is sealed off from the outside and wind travels in path 13, over or around the device.

Figure 6:
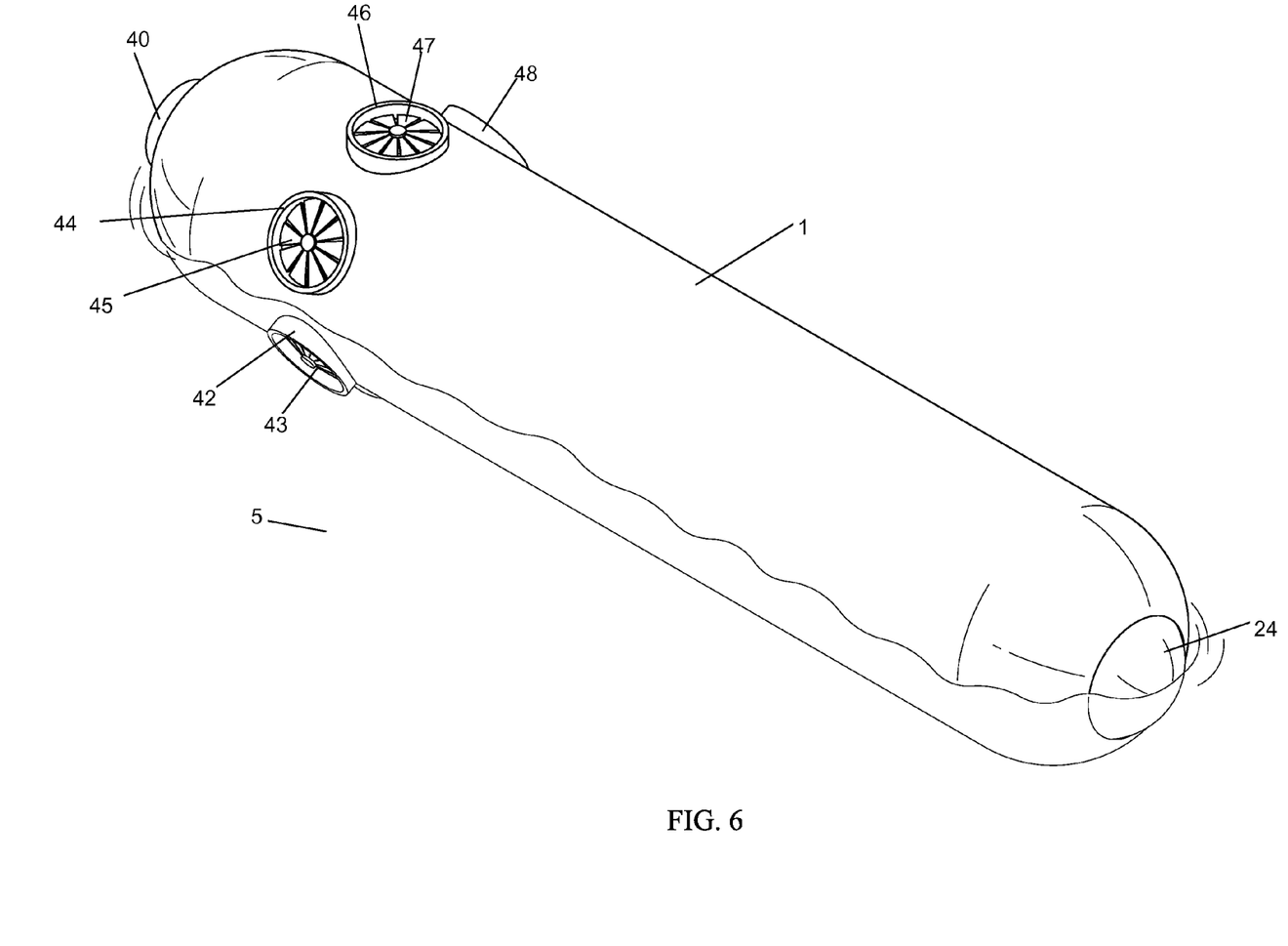
FIG. 6 shows a perspective view of the sealed, submerged wind turbine of FIG. 5.

FIG. 6 shows a perspective view of the sealed, submerged wind turbine of FIG. 5. Again, the wind turbine is shown partially submerged in water 5. In this case, plunger head 24 of the plunger 20 is extending through the intake portal 10 (shown as a circle around the plunger head 24). The outtake portals 40, 42, 44, 46, and 48 are all sealed either by vanes or a cover represented by elements 43, 45, and 47. In embodiments of the disclosed technology, the device is bolted or otherwise fixed to the ground or a support structure, such as a train track, on the side or above the device. In this manner, the position stays the same regardless of water. The device may also be integrated into a train or subway electrical system, receiving power therefrom for opening and closing the intake or outtake openings and vents, and providing power back to the grid, obtained from passing wind. As such, a series of these devices may be placed under or near tracks along a stretch of such track, opening and closing as trains pass by. Each device may provide wind speed information, including the speed of wind passing through it to determine wind patterns and to calculate when devices down-track from a train should open in a timely manner to prepare to receive anticipated wind.

Figure 7:
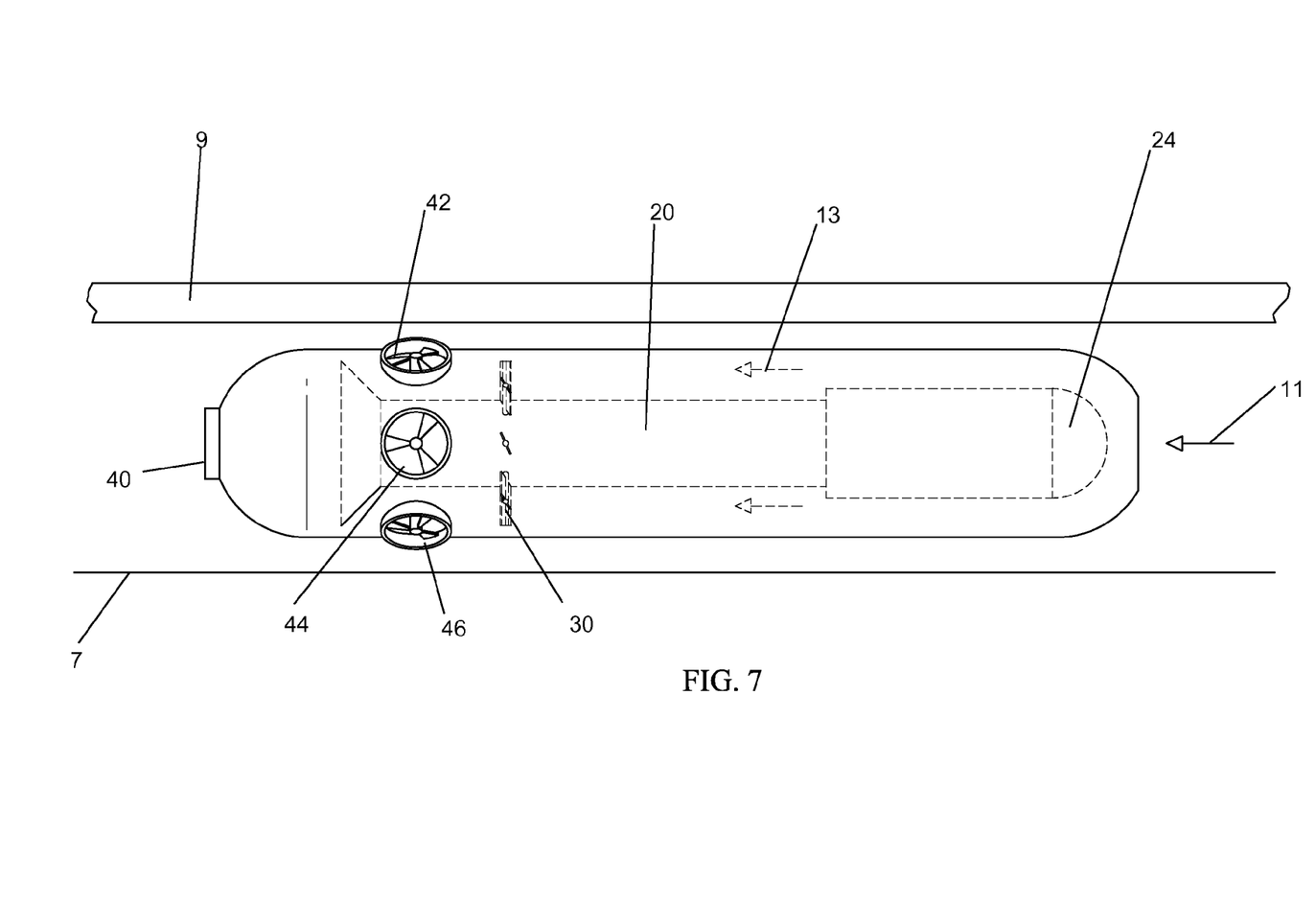
FIG. 7 shows a wind-turbine of an embodiment of the disclosed technology situated under a railroad tie.

FIG. 7 shows a wind-turbine of an embodiment of the disclosed technology situated under a railroad tie. In this case, the railroad tie 9 is above the turbine device (such as when the device is under a raised monorail or in a dugout above ground 7 between the rails and ground). Air passes by in direction 11, such as due to a passing train, where it hits the plunger head 24 of plunger 20 and is directed around the plunger in direction 13. It should be understood that while this figure is in two dimensions, air passes all around the sides of the plunger 20 where it turns a turbine blade 30, and further, blades of the exit portals 40, 42, 44, 46, and so forth, with the exit portals being situated around the turbine in 360 degrees.

Figure 8:
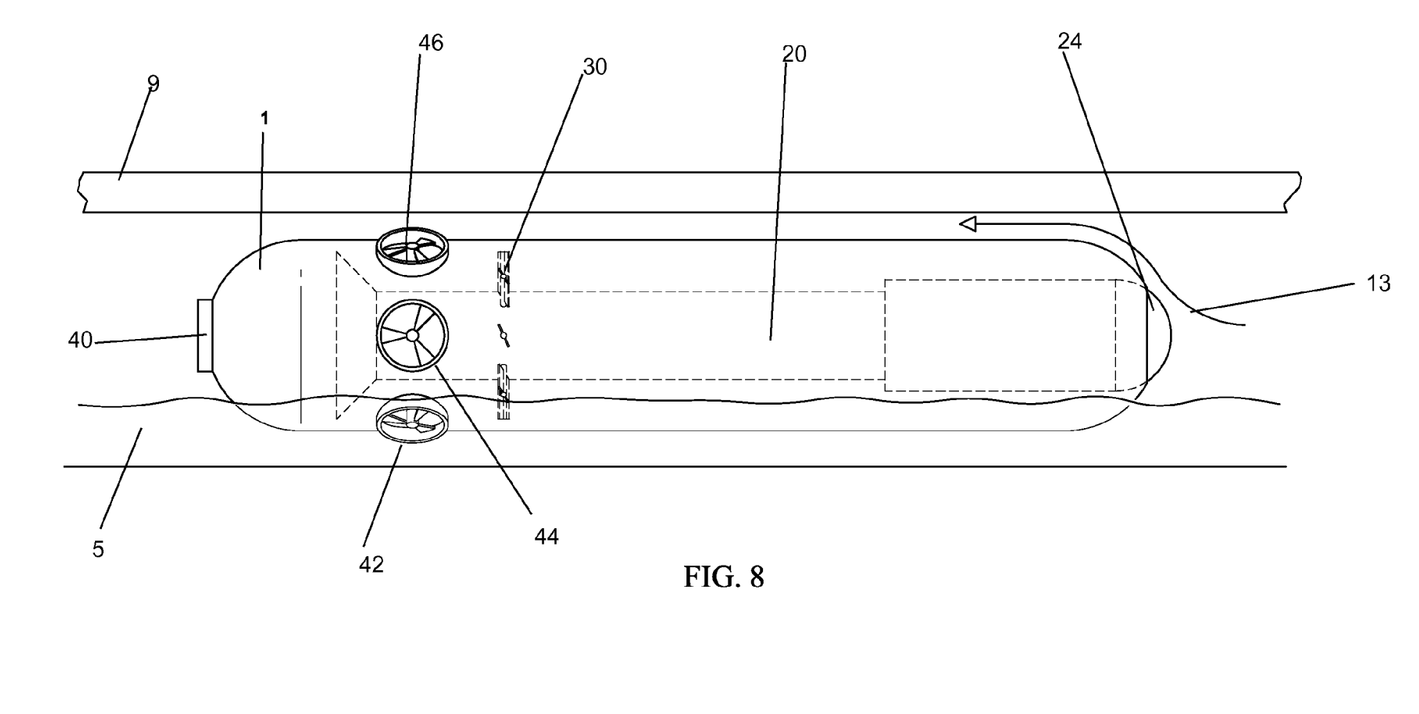
FIG. 8 shows the wind-turbine of FIG. 7 under a railroad tie, partially submerged and in a sealed condition.

FIG. 8 shows the wind-turbine of FIG. 7 under a railroad tie, partially submerged and in a sealed condition. When the device is in water 5, such as when it rains or water collects under a track, then the exit portals 40, 42, 44, 46, and so forth seal, as does the intake portal by way of the head 24 of the plunger 20 sealing in the intake. Air now passes around the device in direction 13, instead of through it. A signal or notification that the device is closed may be sent to a remote location, and the presence of water when it is undesirable, such as long after rain but before the tracks have dried up, may indicate a problem. There may be a pipe leak or other problem causing damage to the train tracks. In this manner, the device signals owners and operators of train tracks of a problem. Still further, if the device itself fails, such as when a track becomes bent, a tree hits the track, or so forth, the lack of persistent updates from the device, or notification of a failure, serves a purpose of notifying the track owner or operator of a problem on the track. This automation reduces the need for physical inspection of the tracks, and directs personnel more quickly to problematic areas of the track, so that repairs can be executed more quickly or preemptively, before a worsening of the problem.

Figure 9:
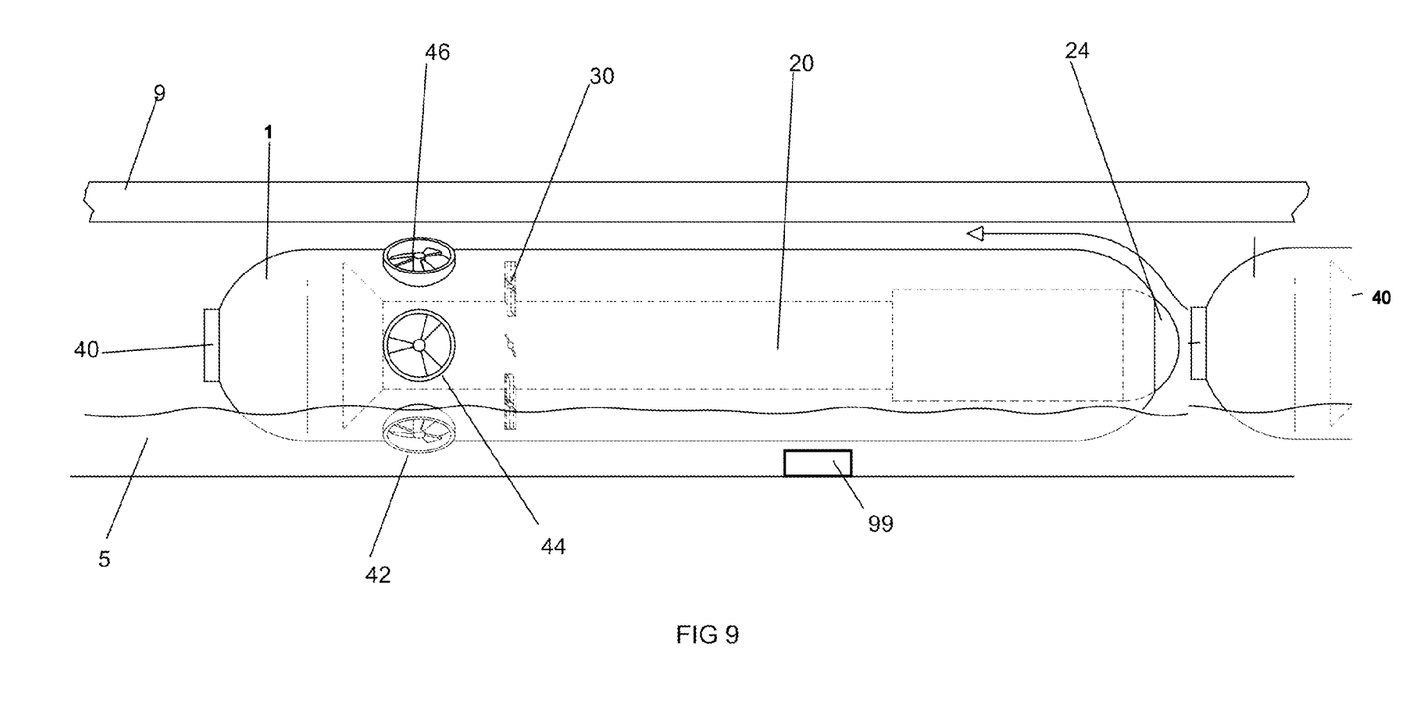
FIG. 9 shows the wind-turbine of FIG. 7 under a railroad tie with sensors.

FIG. 9 shows the wind-turbine of FIG. 7 under a railroad tie with sensors. Box 99 can refer to any one of a water sensor, a water sensor situated below the wind turbine, a wind sensor, or a vibration sensor. A first and second wind turbine coupled together are also shown.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

We claim:

1. A wind turbine, comprising:
   an elongated outer housing including an intake portal;
   a plunger extending along a plunger longitudinal axis in a direction of said elongated outer housing, said plunger being movable in a lateral direction to seal said intake portal;
   at least one sealable exit vent; and
   a blade situated between said plunger and said elongated outer housing;
   wherein:
     a hollow space adapted for airflow is formed between said elongated outer housing and said plunger;
     said blade is adapted to be spun by wind passing therepast about a blade axis; and
     said blade axis coincides with said plunger longitudinal axis.

2. The wind turbine of claim 1, further comprising at least one water sensor providing a signal upon detection of water above a pre-designated threshold, and wherein, in response to said signal, said plunger seals said intake portal and said at least one sealable exit vent is sealed.

3. The wind turbine of claim 1, further comprising at least one wind sensor providing a signal upon detection of wind above a pre-designated threshold, and wherein, in response to said signal, said intake portal and said at least one sealable exit vent are opened.

4. The wind turbine of claim 3, wherein said wind turbine is fixed to a position underneath a train or subway track.

5. A system of wind turbines of claim 4, comprising two said wind turbines wherein:
   a first wind turbine of said two wind turbines is functionally associated with a second wind turbine of said two wind turbines, such that said at least one wind sensor of said first wind turbine is electrically coupled to said second wind turbine; and
   upon detection by said at least one wind sensor of said first wind turbine of said second wind turbine receiving wind from a train traveling in a direction towards said first wind turbine said intake portal and said at least one sealable exit vent of said first wind turbine are opened.

6. The wind turbine of claim 1, wherein:
   said at least one sealable exit vent comprises a first sealable exit vent disposed at an end of said elongated outer housing opposite said intake portal and a plurality of additional sealable exit vents spaced around an exterior surface of said elongated outer housing, each of said additional sealable exit vents being equidistant from said first sealable exit vent and from said intake portal.

7. A system of wind turbines placed in proximity to train or subway tracks, comprising:
   a series of wind turbines, each including an elongate outer housing including an intake opening facing towards an anticipated direction of an oncoming train and being openable and sealable;
   a plunger arranged along a longitudinal plunger axis and movable into said intake opening thereby to seal said intake opening, said plunger being movable into an interior of said wind turbine, away from said intake opening, thereby to open said intake opening; and an internal rotary element that turns and generates electricity when air passes through said intake opening and around the sides of said movable plunger, the air exiting through said exit vents after passing said internal rotary element, said internal rotary element turning about a longitudinal axis of rotation which coincides with said longitudinal plunger axis; and at least one wind sensor proximate to each wind turbine in said series of wind turbines, wherein upon detection, by one of said at least one wind sensor, of wind from a passing train above a pre-designated threshold, at least one wind turbine in said series proximate to a location where said train is expected to pass opens said intake opening, and wherein said elongated outer housings of different wind turbines in said series of wind turbines are physically separated from one another.

8. The system of claim 7, further comprising at least one water sensor physically attached to each wind turbine in said series of wind turbines, wherein upon detection of water by one of said at least one water sensor, a specific said wind turbine to which said one of said at least one water sensor is physically attached, closes said intake opening.

9. The system of claim 7, further comprising at least one water sensor proximate to each wind turbine in said series of wind turbines, wherein upon detection of water by one of said at least one water sensor, said intake openings of all wind turbines in said series proximate said one of said at least one water sensor are closed.

10. The system of claim 9, wherein upon said detection of water, all openings of all said wind turbines proximate said one of said at least one water sensor are closed.

11. The system of claim 7, wherein each wind turbine in said series further comprises at least one sealable exit vent, and wherein closing of said intake opening and said at least one exit vent of a specific wind turbine in said series of wind turbines seals an interior space of said specific wind turbine.

12. The system of claim 11, further comprising at least one water sensor proximate to each wind turbine in said series of wind turbines, and wherein said intake opening and said at least one exit vent of a specific wind turbine of said series of wind turbines are closed unless:

at least one water sensor within a pre-determined distance from said specific wind turbine detects a lack of water, threatening said wind turbine;

at least one wind sensor detects wind from a passing train, said train passing in a direction towards said intake opening of said specific wind turbine; or functions of said specific wind turbine are determined to be operational.

13. The system of claim 12, wherein at least one said water sensor is below said specific wind turbine, and at least one said water sensor detects rain falling above said specific wind turbine.

14. The system of claim 11, wherein:

each said wind turbine in said series includes an elongated outer housing including said intake opening;

said at least one sealable exit vent comprises a first sealable exit vent arranged on one end of said elongated outer housing opposite said intake opening and a plurality of additional sealable exit vents that are spaced apart around said elongated outer housing of each said wind turbine in said series.

15. A method for harvesting wind power, comprising:

providing a first and a second wind turbine according to claim 1;

fixing said first wind turbine and said second wind turbine to positions beneath a train or a subway track, such that a first wind sensor associated with said first wind turbine is electrically coupled to said second wind turbine; and upon detection by said first wind sensor of said second wind turbine receiving wind from a train traveling in a direction towards said first wind turbine, opening said intake portal and said at least one sealable exit vent of said first wind turbine.

16. A method for harvesting wind power, comprising:

placing a plurality of wind turbines in series in proximity to train or subway tracks, each of said plurality of wind turbines comprising an elongate outer housing including an intake opening facing towards an anticipated direction of an oncoming train, said intake opening having a plunger movable into and out of said opening in a direction transverse to said opening, creating a seal on said intake opening when closed, and a blade situated between said plunger and said elongate outer housing, wherein said blade is adapted to be spun by wind passing there-past about a blade axis, and said blade axis coincides with the direction transverse to said opening said elongate housings of different ones of said plurality of wind turbines being physically separate from one another;

providing at least one wind sensor proximate to each wind turbine in said plurality of wind turbines; and upon detection by one of said at least one wind sensor, of wind from a passing train, the wind being above a pre-designated threshold, opening said intake opening of at least one wind turbine in said series proximate to a location where said train is expected to pass.

17. The method of claim 16, further comprising:

providing at least one water sensor physically attached to each wind turbine in said series of wind turbines; and upon detection of water by one of said at least one water sensor, closing said intake opening of a specific said wind turbine to which said one of said at least one water sensor is physically attached.

18. The method of claim 16, wherein each wind turbine in said series further comprises at least one sealable exit vent, the method further comprises closing said intake opening and said at least one exit vent of a specific wind turbine in said series of wind turbines thereby to seal an interior space of said specific wind turbine.

19. The method of claim 18, further comprising:

providing at least one water sensor proximate to each wind turbine in said series of wind turbines;

employing said at least one water sensor to sense presence and lack of water within a predetermined distance from a specific wind turbine located in proximity to said at least one water sensor; and upon said at least one water sensor sensing lack of water within said predetermined distance from said specific wind turbine, opening said intake opening and said at least one exit vent of said specific wind turbine.

* * * * *